US008744856B1

(12) United States Patent
Ravishankar

(10) Patent No.: US 8,744,856 B1
(45) Date of Patent: Jun. 3, 2014

(54) COMPUTER IMPLEMENTED SYSTEM AND METHOD AND COMPUTER PROGRAM PRODUCT FOR EVALUATING PRONUNCIATION OF PHONEMES IN A LANGUAGE

(75) Inventor: Mosur K. Ravishankar, Mars, PA (US)

(73) Assignee: Carnegie Speech Company, Pittsburg, PA (US)

(*) Notice: Subject to any disclaimer, the term of this patent is extended or adjusted under 35 U.S.C. 154(b) by 276 days.

(21) Appl. No.: 13/401,483

(22) Filed: Feb. 21, 2012

Related U.S. Application Data

(60) Provisional application No. 61/445,409, filed on Feb. 22, 2011.

(51) Int. Cl.
G10L 21/00 (2013.01)
G10L 15/00 (2013.01)
G10L 15/04 (2013.01)
G10L 21/06 (2013.01)
G09B 19/04 (2006.01)
G10L 25/60 (2013.01)

(52) U.S. Cl.
CPC ............... G10L 25/60 (2013.01); G09B 19/04 (2013.01)
USPC ........... 704/270; 704/240; 704/254; 704/276; 434/185

(58) Field of Classification Search
CPC ................................ G10L 25/60; G09B 19/04
See application file for complete search history.

(56) References Cited

U.S. PATENT DOCUMENTS 5,329,608 A 7/1994 Bocchieri
5,393,236 A * 2/1995 Blackmer et al. ............. 434/169
5,487,671 A 1/1996 Shpiro
5,857,173 A 1/1999 Beard
6,055,498 A 4/2000 Neumeyer (Continued)

OTHER PUBLICATIONS

Neumeyer, Leonardo, et al. "Automatic scoring of pronunciation quality." Speech Communication 30.2 (2000): 83-93.*

(Continued)

Primary Examiner — Brian Albertalli
(74) Attorney, Agent, or Firm — Jeffrey R. McFadden; Womble Carlyle Sandridge & Rice LLP

(57) ABSTRACT

A computer implemented method, system and computer program product for evaluating pronunciation. Known phonemes are stored in a computer memory. A spoken utterance corresponding to a target utterance, comprised of a sequence of target phonemes, is received and stored in a computer memory. The spoken utterance is segmented into a sequence of spoken phonemes, each corresponding to a target phoneme. For each spoken phoneme, a relative posterior probability is calculated that the spoken phoneme is the corresponding target phoneme. If the calculated probability is greater than a first threshold, an indication that the target phoneme was pronounced correctly is output; if less than a first threshold, an indication that the target phoneme was pronounced incorrectly is output. If the probability is less than a first threshold and greater than a second threshold, an indication that pronunciation of the target phoneme was acceptable is output.

23 Claims, 12 Drawing Sheets

(56) References Cited

U.S. PATENT DOCUMENTS

| | | | |
|---|---|---|---|
| 7,219,059 B2 | 5/2007 | Gupta | |
| 7,299,188 B2 * | 11/2007 | Gupta et al. | 704/276 |
| 7,401,018 B2 * | 7/2008 | Yamada et al. | 704/251 |
| 7,752,045 B2 | 7/2010 | Eskenazi | |
| 7,962,327 B2 * | 6/2011 | Kuo et al. | 704/9 |
| 8,392,190 B2 * | 3/2013 | Chen et al. | 704/256.1 |
| 8,543,400 B2 * | 9/2013 | Lee et al. | 704/243 |
| 2003/0225580 A1 * | 12/2003 | Lin | 704/254 |
| 2004/0215445 A1 | 10/2004 | Kojima | |
| 2004/0230431 A1 * | 11/2004 | Gupta et al. | 704/254 |
| 2006/0004567 A1 * | 1/2006 | Russell | 704/209 |
| 2006/0057545 A1 | 3/2006 | Mozer | |
| 2009/0119109 A1 * | 5/2009 | Willmann et al. | 704/271 |

OTHER PUBLICATIONS

Cucchiarini, C., et al., Oral Proficiency Training in Dutch L2: the Contribution of ASR-based Corrective Feedback, Speech Communication, vol. 51, 2009, pp. 853-863.

Wessel, Frank, et al., Confidence Measures for Large Vocabulary Continuous Speech Recognition, IEEE Transactions on Speech and Audio Processing, vol. 9, No. 3, Mar. 2001, pp. 288-298.

Witt, S.M., S.J. Young, Phone-level Pronunciation Scoring and Assessment for Interactive Language Learning, Speech Communication, vol. 30, 2000, pp. 95-108.

* cited by examiner

COMPUTER IMPLEMENTED SYSTEM AND METHOD AND COMPUTER PROGRAM PRODUCT FOR EVALUATING PRONUNCIATION OF PHONEMES IN A LANGUAGE

CROSS-REFERENCE TO RELATED APPLICATION

This Application claims priority to U.S. Provisional Patent Application Ser. No. 61/445,409, filed Feb. 22, 2011, which is hereby incorporated by reference herein in its entirety.

FIELD OF THE INVENTION

The invention relates to a computer implemented system and method, and a computer program product, for evaluating pronunciation of phonemes in a language.

BACKGROUND OF THE INVENTION

Automatically classifying an object (with its set of feature values) as an adequate representative of a particular category is a difficult problem when the values of individual features are not sufficient to discriminate among categories, nor are linear combinations of feature values sufficient for accurate discrimination. The automated classification task is particularly important for automated speech recognition, and the evaluation of speech pronunciation. One conventional method for automated classification is to measure the distance of the object's features to the features of an exemplar of the category. If that distance is less than some threshold, and the distance is less than to members of other categories, then the original object is an adequate representative of the first category. This is known as the "distance-threshold" methodology, and is sometimes also called the "k-nearest-neighbors" method. This methodology, whether or not it relies only on distance to the target category or also on distance to members of other categories, assumes that the exemplar's features were measured under the same conditions as the object's features, which is not necessarily always the case. An embodiment of the present invention can normalize the features of the exemplar.

Pronouncing the phonemes of a language accurately is important for producing intelligible speech. Phonemes are the smallest units of recognizable speech sounds, typically smaller than a syllable. For example, the word MAN has three phonemes: the M sound, the vowel sound in the middle, and the final N sound.

Evaluating pronunciation of phonemes, for purposes of teaching a foreign language, providing speech therapy, etc. is made difficult because of acoustic noise in recording speech for evaluation and the natural, acceptable variations in speech. An embodiment of the present invention is a system and method and computer program product for evaluating a user's pronunciation of phonemes in a language that minimizes the impact of such acoustic noise and variations in speech.

DETAILED DESCRIPTION

Accurate recognition, measurement and assessment of pronunciation is very useful for teaching a student to speak a language intelligibly. An embodiment of the invention addresses how to achieve accurate and reliable pronunciation assessment at reasonable development cost by reducing it to a classification problem using a relative posterior probability algorithm.

A conventional posterior probability algorithm assumes that a test has a finite set of discrete outcomes. That is, a given datum or observation can be classified into one of several categories or classes (for example, phonemes in a language). But the classification may not be unambiguous. Assuming there are N possible categories, based on the input observation or datum x, a classification algorithm may assign a numerical raw score or likelihood value to each of the N categories.

Figure 1:
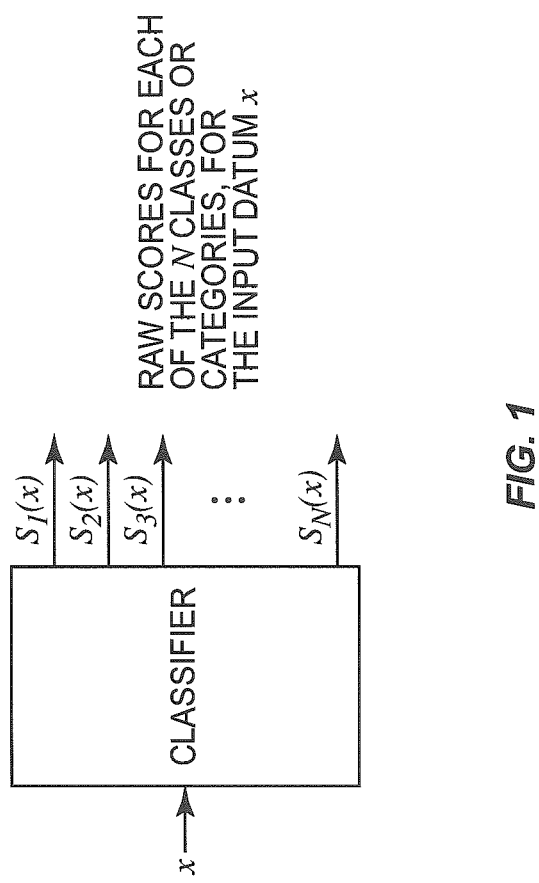
FIG. 1 is a diagram that illustrates the computation of the raw scores for each category, given an input observation.

FIG. 1 is a diagram that illustrates the computation of the raw scores for each category, given the input observation. These values represent the likelihood that the input observation belongs to each of the various categories, i.e., the higher a raw score, the greater the likelihood is that the observation came from that category. The numerical raw scores themselves may or may not have any physical meaning, and the invention is not limited to the classifier algorithm for computing the raw scores. The raw scores may be represented by the following equation:

$$S_i(x), i = 1 \ldots N.$$  (Eq. 1)

The raw scores may be computed automatically by commercially available automatic speech recognition software. Suitable ASR software is the Nuance Recognizer, which is available from Nuance Communications, Inc. of Burlington, Mass. Another suitable ASR application is CMU Sphinx, which is available for download at http://cmusphinx.sourceforge.net/.

Figure 2:
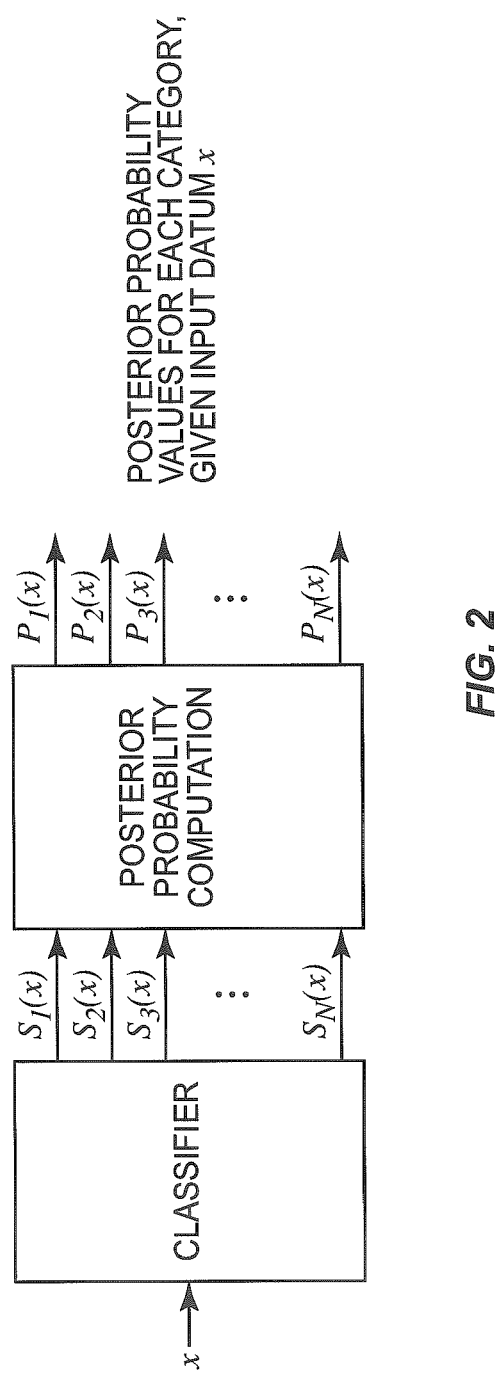
FIG. 2 is a diagram that illustrates the computation of posterior probability values for each category from the raw scores.

FIG. 2 is a diagram that illustrates the computation of posterior probability values for each category from the raw scores. As can be seen from FIG. 2, based on the computed raw scores, the posterior probability algorithm computes a probability $P_i(x)$, for each category, given the input observation x, as follows:

$$P_i(x) = S_i(x)/(\Sigma(S_i(x)))$$  (Eq. 2)

In the above equation, $(\Sigma S_i(x))$ represents the sum of the raw scores for all the N categories, given the input datum x.

Figure 3:
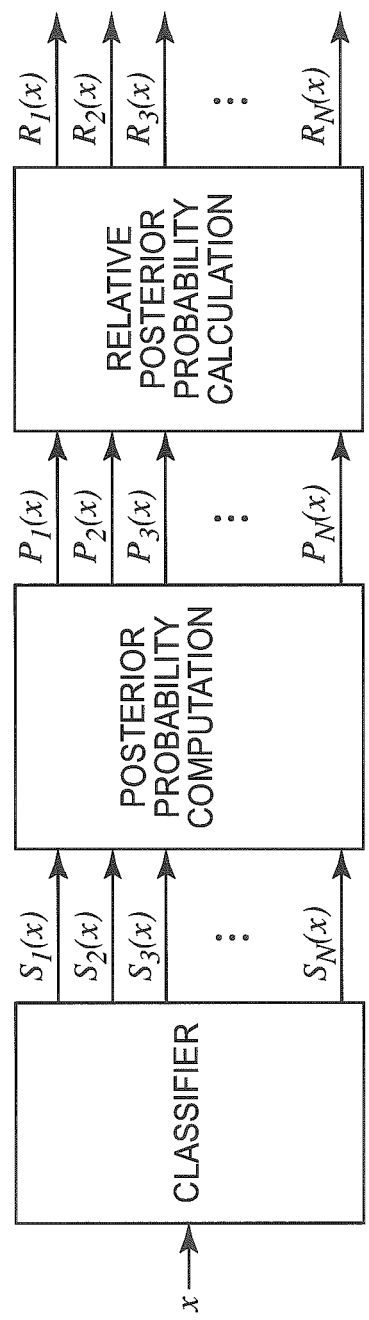
FIG. 3 is a diagram that illustrates the computation of relative posterior probability values for each category from the raw scores.

FIG. 3 is a diagram that illustrates the computation of relative posterior probability values for each category from the raw scores. In many applications, the use of conventional posterior probability does not produce acceptable results because the set of categories may be confusable. In such cases, the posterior probability values tend to be low, even for the correct categories. Thus, setting a reasonable decision threshold is difficult. The Relative Posterior Probability, denoted by R, overcomes this disadvantage. Specifically, the relative posterior probability for each category, given the input datum x, is computed as follows:

$$R_i(x) = P_i(x)/(\max(P_i(x)))$$  (Eq. 3)

In the above equation, $(\max (P_i(x)))$ represents the maximum of the N posterior probability values, given the input datum x.

According to an embodiment of the invention, a target utterance, such as a word, phrase, or sentence, to be spoken out loud is displayed to a user. The user's speech may be captured through a microphone connected to a computer, stored in a computer memory and analyzed using automatic speech recognition software to determine how accurately the user pronounced the target utterance.

In an embodiment of the invention, the automatic speech recognition software converts or segments the target utterance into a sequence of target phonemes, based on a pronunciation dictionary that defines the correct phonetic pronunciation for each word. For example, the word SHE is made up of two phonemes, labeled SH and IY. (There are approximately 43 known phonemes in the English language. Other target languages may have a different number of known phonemes.) The automatic speech recognition software also allows for optional silences before and after every word in the given word, phrase or sentence. Silence may be denoted by SIL.

Figure 4:
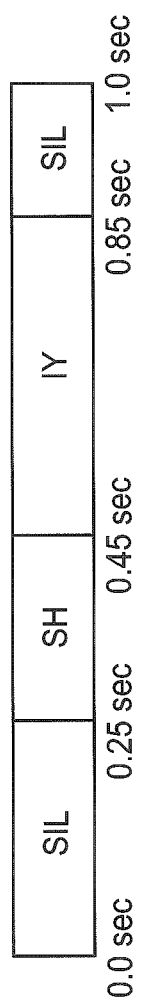
FIG. 4 is a diagram that illustrates the segmentation of a spoken utterance into a sequence of spoken phonemes and the alignment to the sequence of spoken phonemes to corresponding sequence of phonemes of a target utterance.

FIG. 4 is a diagram that illustrates the segmentation of a spoken utterance into a sequence of spoken phonemes and the alignment to the sequence of spoken phonemes to corresponding phonemes of a target utterance. More specifically, FIG. 4 illustrates the segmentation, via automatic speech recognition software, of a spoken utterance corresponding to the target utterance "SHE" into silence and a sequence of spoken phonemes that correspond to the sequence of target phonemes of the target utterance. The invention, however, is not limited to a particular method for segmenting the spoken utterance or aligning the spoken utterance to the target utterance. As can be seen from FIG. 4, the recorded spoken utterance is segmented into a silent segment (SIL) from 0.0 seconds to about 0.25 seconds, the SH phoneme from about 0.25 seconds to about 0.45 seconds, the IY phoneme from about 0.45 seconds to about 0.85 seconds and a silent segment (SIL) from 0.85 seconds to 1.0 seconds.

As shown in FIG. 4, a spoken utterance may include segments that are silent. Typically, silent segments occur at the beginning and end of the recording of the spoken utterance, but also may occur between words comprising the spoken and/or target utterances. In segmenting the spoken utterance, ASR software also identifies segments that are silent, which are discarded from further evaluation of the spoken utterance.

Figure 5:
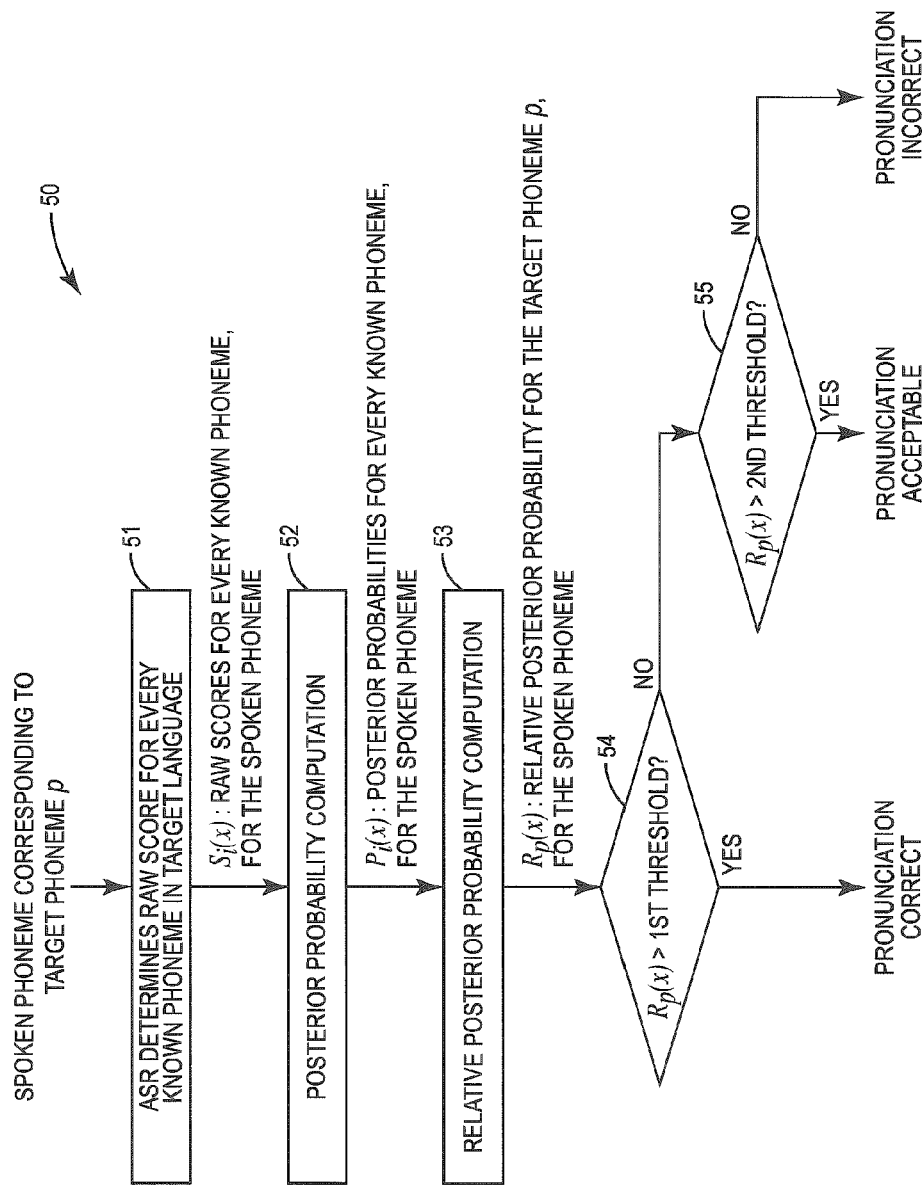
FIG. 5 is a flow diagram illustrating an exemplary method for evaluating pronunciation of a spoken phoneme of an utterance spoken by a user.

FIG. 5 is a flow diagram illustrating a method 50 for evaluating each spoken phoneme, i.e., each phoneme in an utterance spoken by a user. In block 51, automatic speech recognition software uses internal phoneme acoustic models to compute raw scores representing how well each spoken phoneme matches each of the known phonemes in the target language. The raw scores are represented by the $S_i(x)$ values in Equation 1 above, where i ranges from 1 to N, where N is the number of known phonemes in the target language. Processing control is then transferred to block 52.

Based on the raw scores computed in block 51, in block 52, the method computes the posterior probability that the spoken phoneme is each of the known phonemes in the target language, using Equation 2 above. The posterior probability values for each known phoneme in the target language are represented by the $P_i(x)$ values. Processing control is then transferred to block 53.

In block 53, based on the posterior probability values computed in block 52, the method computes the relative posterior probability that the spoken phoneme is the target phoneme, i.e., the phoneme that the user is expected to speak in the speech segment, using Equation 3 above. It is noted that, while Equation 3 can be used to compute the relative posterior probability that the spoken phoneme is each of known phonemes in the target language, it is only necessary to calculate the relative posterior probability that the spoken phoneme is the target phoneme. The relative posterior probability the spoken phoneme is the target phoneme is represented by $R_p(x)$, where p represents the target phoneme. Processing control is then transferred to block 54.

In block 54, the relative posterior probability that the spoken phoneme is the target phoneme, i.e., the $R_p(x)$ value, is compared to a first predetermined threshold. If $R_p(x)$ is greater than (or equal to) the first predetermined threshold, then the pronunciation of the target phoneme by the user is deemed to be correct. If $R_p(x)$ is less than the first predetermined threshold, processing control is transferred to block 55.

In block 55, the $R_p(x)$ value is compared to a second predetermined threshold. If $R_p(x)$ is greater than (or equal to) the second predetermined threshold, then the pronunciation of the target phoneme by the user is deemed to be acceptable. If $R_p(x)$ is less than the second predetermined threshold, then the pronunciation of the target phoneme by the user is deemed to be incorrect. The first and second predetermined threshold values are determined separately. As can be appreciated and described in more detail below, the first and second predetermined threshold values may be determined empirically by statistics derived from known training data.

In an embodiment, the predetermined thresholds may be set to default values. For example, the first predetermined threshold may be between about 0.4 and 0.6. Alternatively, the first predetermined threshold may be about 0.5. Similarly, the second predetermined threshold may be between about 0.1 and 0.3. Alternatively, the first predetermined threshold may be about 0.2.

In an alternative embodiment, the first and or second thresholds may be determined by the following process. The process described below may be used to determine the first and second thresholds for each known phoneme in a language. The process described below, however, is for determining first and second thresholds for a single known phoneme. As can be appreciated, the process can be used to determine first and second thresholds for all of the known phonemes of the target language.

The alternative process for determining first and second thresholds for a single known phoneme begins with obtaining a large set of recorded spoken utterances by typical speakers of the language that correspond to a representative sample of target utterances in the language. A relative posterior probability is calculated in the manner described above for each spoken phoneme of each spoken utterance that corresponds to each target phoneme of each target utterance. In parallel, a person knowledgeable of correct and incorrect pronunciation of phonemes in the language evaluates each of the spoken phonemes relative to the corresponding target phoneme, and the pronunciation of each spoken phoneme is classified as being correct, acceptable, or incorrect. Next, a first histogram is computed of the relative posterior probabilities for all spoken phonemes in all spoken utterances that correspond to the single known phoneme and that were classified as being correct. Similarly, second and third histograms are computed of the relative posterior probabilities for all spoken phonemes in all spoken utterances that correspond to the single known phoneme and that were classified as being acceptable and correct, respectively. Based on the first and second histograms, a first threshold is selected that minimizes the number of instances that a correct pronunciation of the single known phoneme was misclassified as acceptable or incorrect. The first threshold is typically at the intersection of the first and second histograms. Similarly, based on the second and third histograms, a second threshold is selected that minimizes the number of instances that an incorrect pronunciation of the single known phoneme was misclassified as acceptable or correct. The second threshold is typically at the intersection point of the second and third histograms.

The foregoing method of setting thresholds results in a relatively unbiased evaluation of pronunciation. As can be appreciated, however, the first and second thresholds may be selected so as to bias the evaluation of pronunciation of phonemes as correct or acceptable to reduce user frustration.

Figure 6A:
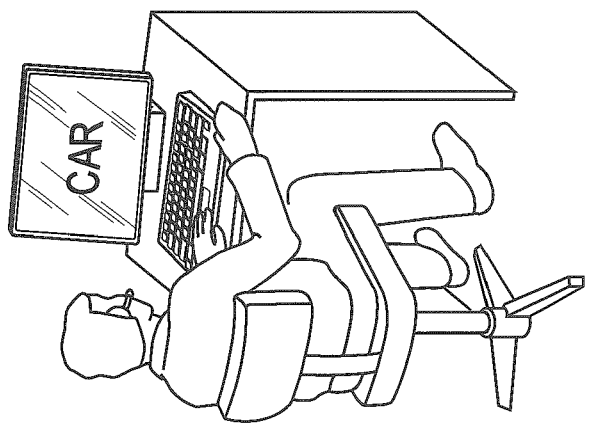
FIGS. 6A-C are diagrams that illustrate a user operating a computer embodying the invention.
Figure 6B:
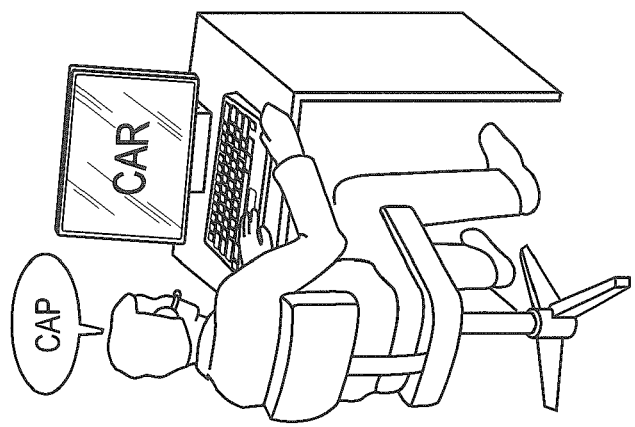
Figure 6C:
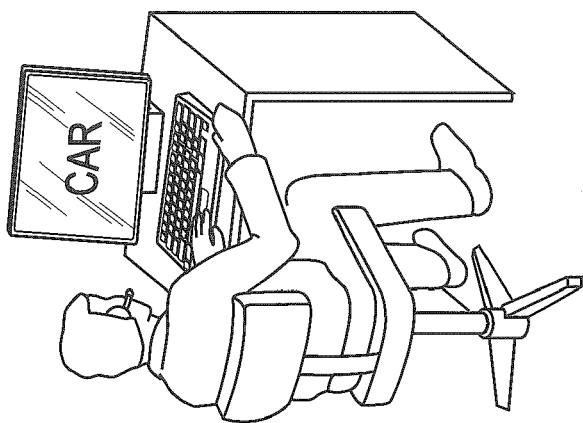

FIGS. 6A-C are diagrams that illustrate a user operating a computer with a headset including a microphone that is connected to the computer. As illustrated in FIG. 6A, a software application embodying the invention displays to the user a target utterance consisting of a word, phrase or sentence for the user to read out aloud. For example, the application may cause the word "CAR" to be displayed. In this example, the target utterance is the word "CAR," which is comprised of a sequence of three target phonemes, represented as "K," "AA," and "R."

As illustrated in FIG. 6B, the user pronounces the target utterance, which is captured by and stored in the computer via the user's microphone. The captured speech, i.e., the spoken utterance, is then processed according to an embodiment of the invention to determine if the individual target phonemes of the target utterance, "CAR," were pronounced correctly or not. In the example illustrated in FIG. 6B, the user speaks the word "CAP," which is captured by the computer and stored in computer memory.

As illustrated in FIG. 6C, the result of the analysis may be displayed to the user. The results may be displayed by color-coding the corresponding letters of the target utterance, for example, green for correct pronunciation, orange or yellow for acceptable pronunciation, and red for incorrect pronunciation. In the example, the letters "C" and "A" may be displayed in the color green because the corresponding target phonemes were pronounced correctly, while the letter "R" may be displayed in the color red because the corresponding target phoneme was pronounced incorrectly, that is, the user spoke the word "CAP," instead of the target utterance, "CAR."

In an embodiment of the invention, the way in which the letters of the target utterance are displayed to indicate whether the corresponding target phonemes are correctly pronounced may be customizable by the user. For example, the user may select the color in which target phonemes are displayed when the pronunciation of the target phoneme is correct, acceptable or incorrect, as the case may be.

Figure 7:
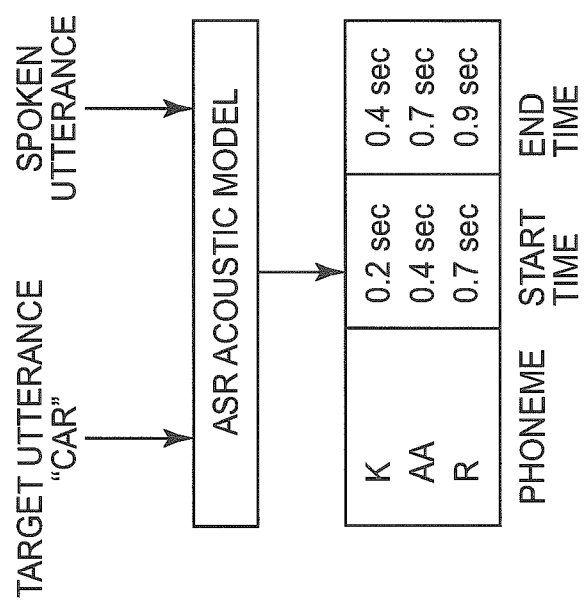
FIG. 7 is a diagram that illustrates the segmentation of an exemplary spoken utterance into a sequence of spoken phonemes corresponding to the sequence of target phonemes of the target utterance.

FIG. 7 is a diagram that illustrates the segmentation of an exemplary spoken utterance into a sequence of spoken phonemes based on the sequence of target phonemes of the target utterance. For example, the target utterance "CAR" may be segmented into the phonemes K, AA, and R. As shown in FIG. 7, the result includes, for each target phoneme, its starting and ending times within the recorded spoken utterance.

FIGS. 8-FIG. 11 are diagrams that illustrate the processing for the exemplary target phoneme K. (The target phonemes AA and R are processed similarly.)

Figure 8:
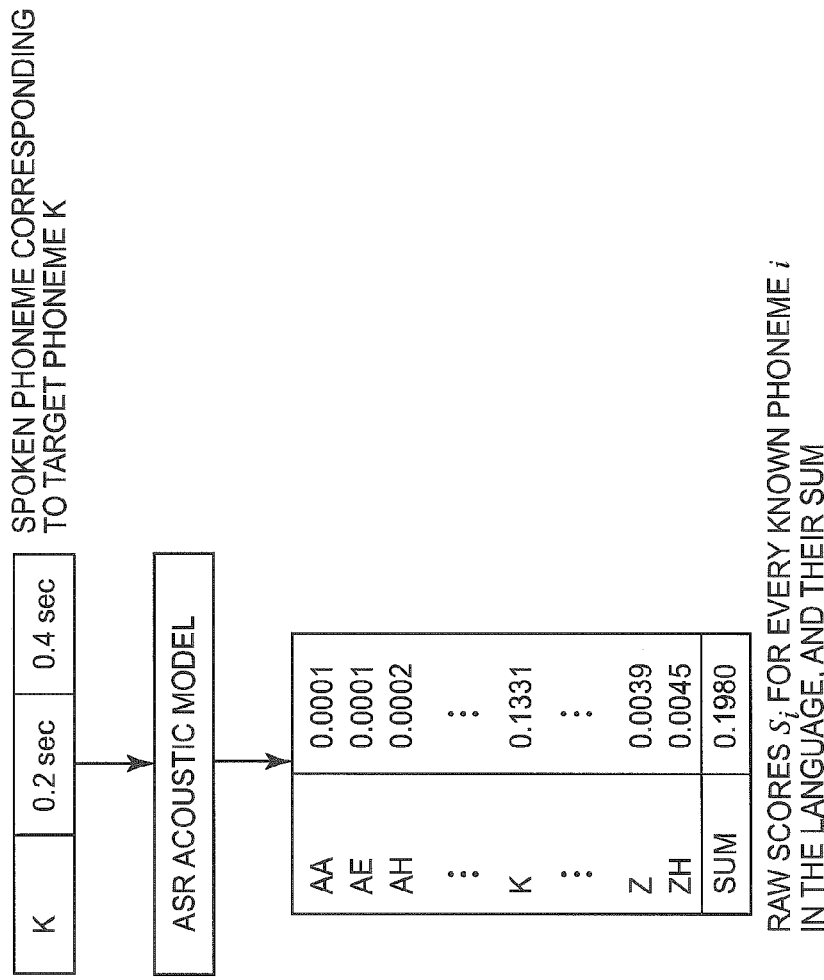
FIG. 8 is a diagram that illustrates the computation of raw scores for an exemplary spoken phoneme that corresponds to the target phoneme K.

FIG. 8 is a diagram that illustrates the computation of raw scores for an exemplary spoken phoneme that corresponds to the target phoneme K. As can be seen from FIG. 8, for each known phoneme in the target language, the ASR software calculates a raw score that represents the likelihood the spoken phoneme corresponding to the target phoneme K is that phoneme. For example, the ASR software may calculate a score of 0.1331 for target phoneme K. As mentioned above, other phoneme acoustic models embodied in various ASR software applications may give the phoneme K lower or higher scores. As also illustrated in FIG. 8, the sum of the raw scores is computed, which, in the example, is 0.1980.

Figure 9:
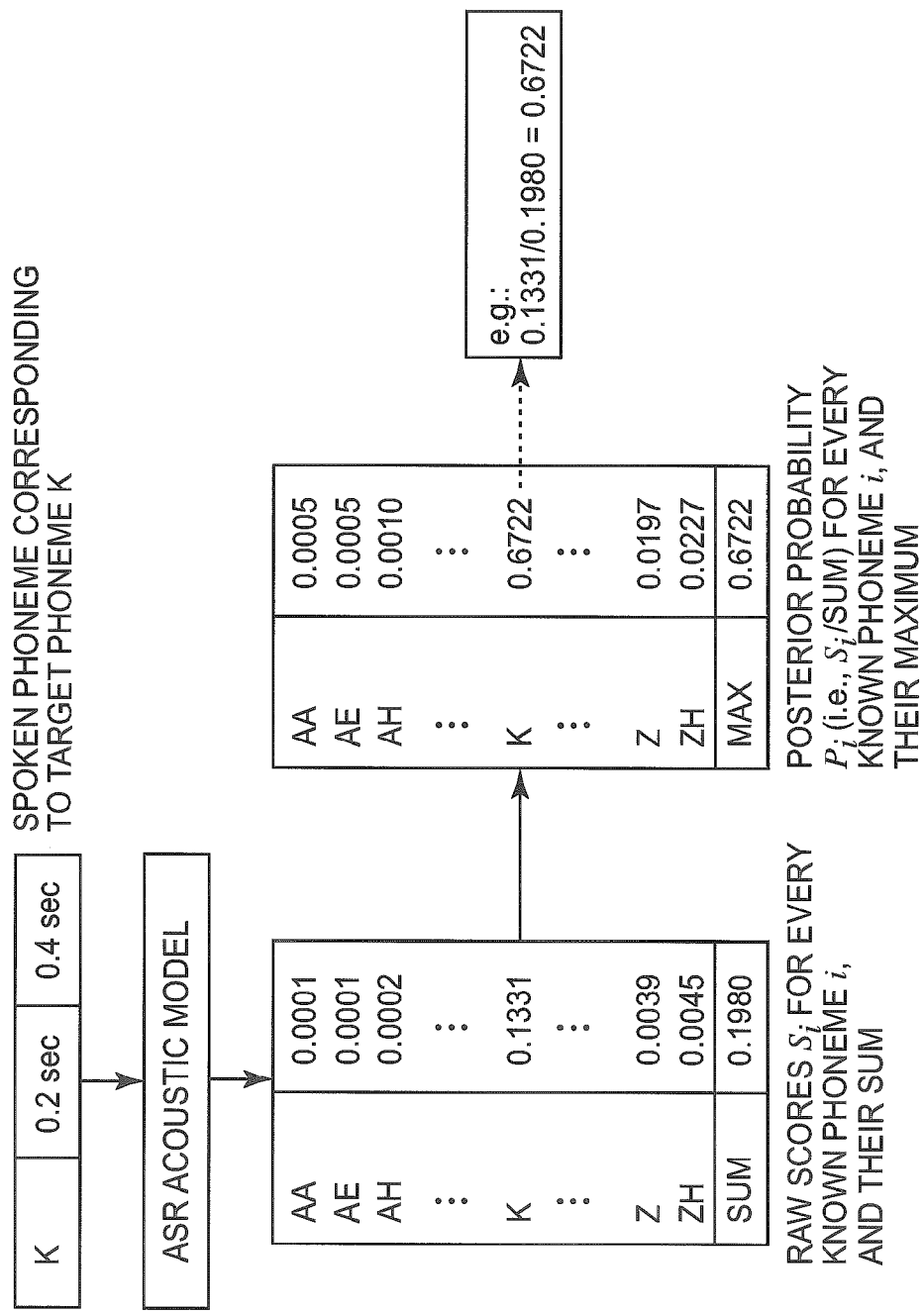
FIG. 9 is a diagram that illustrates the computation of the posterior probability that the exemplary spoken phoneme corresponding to the target phoneme K is each of the known phonemes in the target language.

FIG. 9 is a diagram that illustrates the computation of the posterior probability that the spoken phoneme corresponding to the target phoneme K is each of the known phonemes in the target language. Specifically, the posterior probability that the spoken phoneme is each known phoneme in the target language is calculated by dividing the each phoneme's raw score by the sum of all of the raw scores for each known phoneme in the target language. For example, the posterior probability that the spoken phoneme is the phoneme K is 0.1331 divided by 0.1980, which is 0.6722. The maximum of all posterior probabilities for each known phoneme in the target language is also computed. In the example, the maximum posterior probability is the posterior probability that the spoken phoneme is the phoneme K, which is 0.6722.

Figure 10:
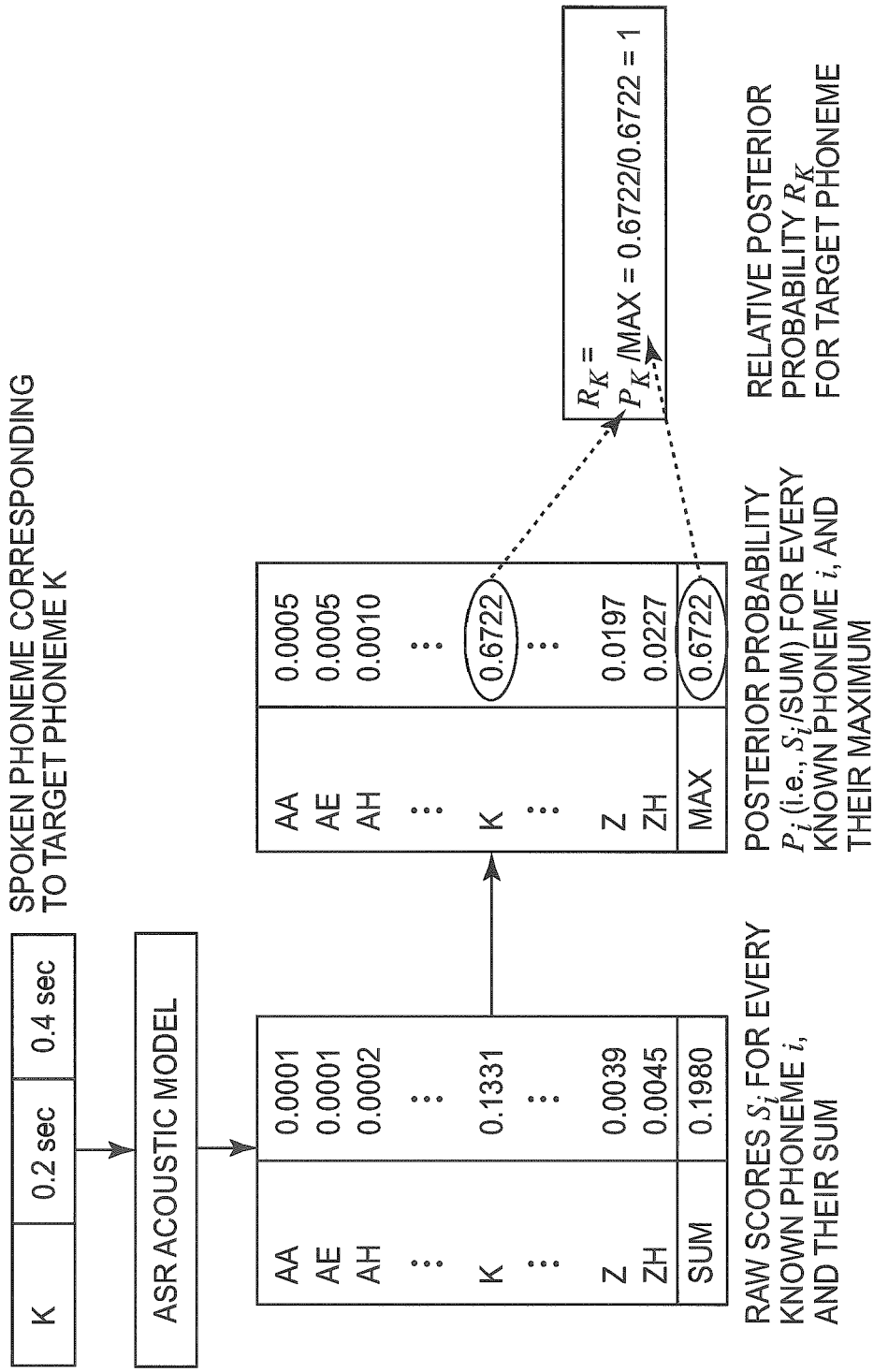
FIG. 10 is a diagram that illustrates the computation of the relative posterior probability that the exemplary spoken phoneme corresponding to the target phoneme K is the target phoneme K.

FIG. 10 is a diagram that illustrates the computation of the relative posterior probability that the spoken phoneme corresponding to the target phoneme K is the target phoneme K. As can be seen from FIG. 10, the relative posterior probability is computed by dividing the posterior probability that the spoken phoneme is the phoneme K by the maximum posterior probability value for all known phonemes in the target language. In the example, the posterior probability that the spoken phoneme is the phoneme K is 0.6722, and the maximum posterior probability value is also 0.6722. Thus, the relative posterior probability that the spoken phoneme is the phoneme K is 0.6722/0.6722, which is 1.0.

Figure 11:
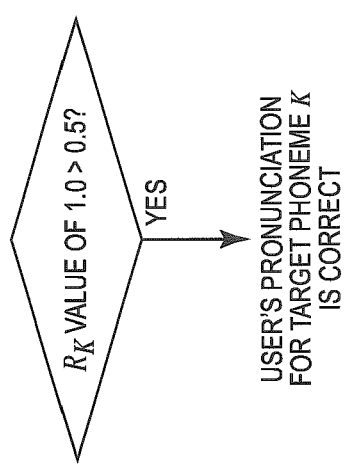
FIG. 11 is a diagram that illustrates the comparison of the computed relative posterior probability that the spoken phoneme is the target phoneme to a first predetermined threshold.

FIG. 11 is a diagram that illustrates the comparison of the relative posterior probability that the spoken phoneme is the phoneme K to a first predetermined threshold. In the example, the first predetermined threshold is 0.5. Since the relative posterior probability value of 1.0 is greater than (or equal to) 0.5, the user's pronunciation of phoneme corresponding to the target phoneme K is deemed to be correct. If the relative posterior probability was less than the first predetermined threshold of 0.5, the relative posterior probability value would then have been compared to a second predetermined threshold. If the relative posterior probability value is greater than (or equal to) the second predetermined threshold, then the pronunciation of the target phoneme K is deemed to be acceptable. If the relative posterior probability is less than the second predetermined threshold, then the pronunciation of the target phoneme K is deemed to be incorrect.

Figure 12:
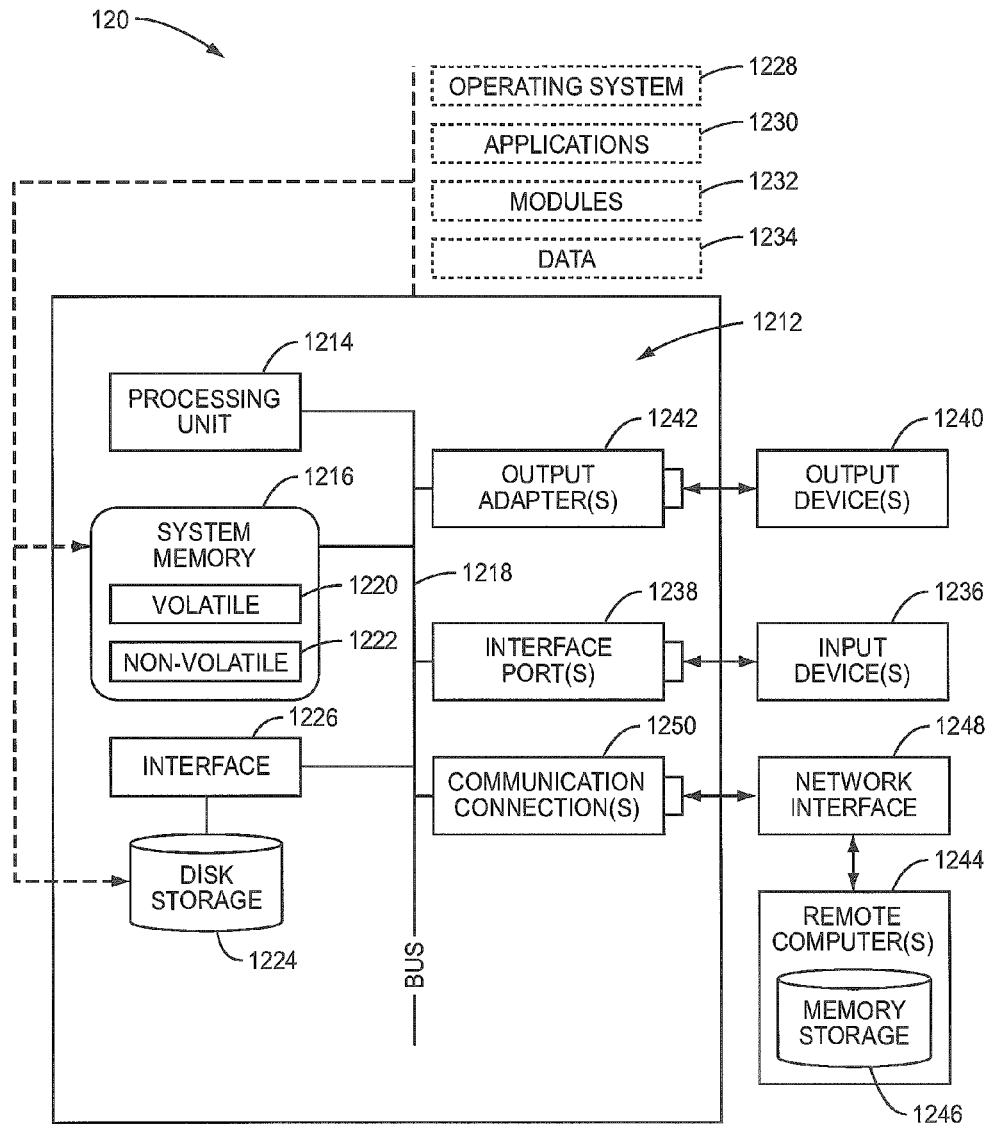
FIG. 12 is a diagram that illustrates exemplary computer hardware and software to implement various embodiments of the invention.

FIG. 12 illustrates exemplary hardware and software components that may be used to implement various embodiments of the present invention. While aspects of the invention may be described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 120 is an exemplary suitable operating environment and does not limit the scope of the invention. Other known computer systems, environments, and/or configurations may be suitable for use with the invention.

Referring to FIG. 12, an exemplary environment 120 for implementing various aspects of the invention includes a computer 1212, which includes a processing unit 1214, a system memory 1216, and a system bus 1218. The system bus 1218 couples the system components including the system memory 1216 to the processing unit 1214. The processing unit 1214 can be any of various processors available. The system bus 1218 can be any of the available types of bus structures using any variety of available bus architectures. The system memory 1216 includes volatile memory 1220 and non-volatile memory 1222.

Computer 1212 also may include removable/non-removable, volatile/non-volatile computer storage media, for example, a disk storage 1224. Disk storage devices 1224 may be connected to the system bus 1218 via removable or non-removable interface 1226.

FIG. 12 also illustrates software that allows interaction between users and computer resources, which may include an operating system 1228. System applications 1230 are allocated resources by operating system 1228 through program modules 1232 and program data 1234 stored either in system memory 1216 or on disk storage 1224. Aspects of the present invention may be implemented with various operating systems or combinations of operating systems.

A user enters commands or information into computer 1212 through input devices 1236, which connect to processing unit 1214 through the system bus 1218 via interface ports 1238. Input devices may include tables, touch screens, keyboards, scanners, microphones, etc., which can be used to input data. Output devices 1240 use some of the same type of ports as input devices 1236. Output adapter 1242 may be provided because some output devices 1240 like monitors, speakers and printers require special adapters. Other devices and/or systems of devices provide both input and output capabilities such as remote computers 1244.

Computer 1212 can operate in a networked environment using logical connections to one or more remote computers, such as remote computers 1244. The remote computers 1244 can be a personal computer, a server, a router, a network PC, a workstation, a microprocessor based appliance, a peer device or other common network node, which may include many or all of the elements of computer 1212. While only a single memory storage device 1246 is shown, remote computers 1244 may be logically connected to computer 1212 through a network interface 1248 and physically connected via communication connection 1250.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A computer implemented method for evaluating the pronunciation of an utterance, comprising:
    a. storing in a computer memory a plurality of known phonemes of a language;
    b. receiving, via a computer processor, an utterance spoken by a user, the utterance spoken by the user corresponding to a target utterance, the target utterance being comprised of a sequence of one or more target phonemes to be spoken by the user, each of the target phonemes being one of the plurality of known phonemes of the language;
    c. storing, in a computer memory, the utterance spoken by the user;
    d. segmenting, via a computer processor, the stored utterance spoken by the user into a sequence of one or more spoken phonemes, each of the spoken phonemes corresponding to one of the target phonemes;
    e. for each of the one or more spoken phonemes,
        i. determining, via a computer processor, for each of the plurality of known phonemes in the language, a value that represents the likelihood that the spoken phoneme is one of the plurality of known phonemes in the language;
        ii. responsive to each of the determined values for the spoken phoneme for each of the plurality of known phonemes in the language, computing, via a computer processor, a posterior probability that the spoken phoneme is one of the plurality of known phonemes;
        iii. responsive to the computed posterior probabilities for the spoken phoneme for each of the plurality of known phonemes in the language, computing, via a computer processor, a relative posterior probability that the spoken phoneme is the corresponding target phoneme;
        iv. comparing, via a computer processor, the computed relative posterior probability to a first predetermined threshold for the target phoneme;

v. when the computed relative posterior probability is greater than or equal to the first predetermined threshold, outputting, via an output device, an indication that the pronunciation of the target phoneme was correct; and vi. when the computed relative posterior probability is less than the first predetermined threshold, outputting, via an output device, an indication that the pronunciation of the target phoneme was incorrect.

2. The computer implemented method of claim 1, wherein the step e. is further comprised of:

vii. comparing, via a computer processor, the computed relative posterior probability to a second predetermined threshold for the target phoneme, wherein the second predetermined threshold is lower than the first predetermined threshold;

viii. when the computed relative posterior probability is less than the first predetermined threshold and greater than or equal to the second predetermined threshold, outputting, via an output device, an indication that the pronunciation of the target phoneme was acceptable; and ix. when the computed relative posterior probability is less than the second predetermined threshold, outputting, via an output device, an indication that the pronunciation of the target phoneme was incorrect.

3. The computer implemented method of claim 1, wherein the step of outputting an indication that the pronunciation of the target phoneme was correct is further comprised of outputting a first visual indication that the pronunciation of the target phoneme was correct.

4. The computer implemented method of claim 1, wherein the step of outputting an indication that the pronunciation of the target phoneme was incorrect is further comprised of outputting a second visual indication that the pronunciation of the target phoneme was incorrect.

5. The computer implemented method of claim 2, wherein the step of outputting an indication that the pronunciation of the target phoneme was acceptable is further comprised of outputting a third visual indication that the pronunciation of the target phoneme was acceptable.

6. The computer implemented method of claim 1, wherein the step of outputting a visual indication that the pronunciation of the target phoneme was correct is further comprised of outputting a visual indication in a first color that the pronunciation of the target phoneme was correct.

7. The computer implemented method of claim 1, wherein the step of outputting a visual indication that the pronunciation of the target phoneme was incorrect is further comprised of outputting a visual indication in a second color that the pronunciation of the target phoneme was incorrect.

8. The computer implemented method of claim 2, wherein the step of outputting a visual indication that the pronunciation of the target phoneme was acceptable is further comprised of outputting a visual indication in a third color that the pronunciation of the target phoneme was acceptable.

9. The computer implemented method of claim 3, further comprising, prior to the step of outputting a first visual indication that the pronunciation of the target phoneme was correct:

receiving from the user a selection for a first color for the first visual indication that the pronunciation of the target phoneme was correct.

10. The computer implemented method of claim 4, further comprising, prior to the step of outputting a second visual indication that the pronunciation of the target phoneme was incorrect:

receiving from the user a selection for a second color for the second visual indication that the pronunciation of the target phoneme was incorrect.

11. The computer implemented method of claim 5, further comprising, prior to the step of outputting a third visual indication that the pronunciation of the target phoneme was acceptable:

receiving from the user a selection for a third color for the third visual indication that the pronunciation of the target phoneme was acceptable.

12. The computer implemented method of claim 1, wherein the first predetermined threshold is between about 0.4 and 0.6.

13. The computer implemented method of claim 12, wherein the first predetermined threshold is about 0.5.

14. The computer implemented method of claim 2, wherein the second predetermined threshold is between about 0.1 and 0.3.

15. The computer implemented method of claim 14, wherein the second predetermined threshold is about 0.2.

16. The computer implemented method of claim 1, further comprising, prior to the step of receiving, via a computer processor, an utterance spoken by the user:

storing in a computer memory, a plurality of target utterances to be spoken by the user in the language, each of the plurality of target utterances being comprised of a sequence of one or more target phonemes to be spoken by the user, each of the target phonemes being one of the plurality of known phonemes of the language; and outputting, via an output device, to the user one of the plurality of target utterances.

17. The computer implemented method of claim 16, wherein the step of outputting, via an output device, to the user one of the plurality of target utterances is further comprised of outputting text representing the one of the plurality of target utterances.

18. The computer implemented method of claim 16, wherein the step of outputting, via an output device, to the user one of the plurality of target utterances is further comprised of outputting an audio signal representing the one of the plurality of target utterances.

19. The computer implemented method of claim 16, wherein the step of segmenting, via a computer processor, the stored utterance spoken by the user into a sequence of one or more spoken phonemes, is further comprised of:

determining a number of target phonemes comprising the target utterance; and segmenting the stored utterance spoken by the user into the determined number of target phonemes.

20. A computer implemented system for evaluating the pronunciation of an utterance, comprising a computing device including a process that is coupled to a computer memory and an output device, wherein the system:

a. stores a plurality of known phonemes of a language;

b. receives an utterance spoken by a user, the utterance spoken by the user corresponding to a target utterance, the target utterance being comprised of a sequence of one or more target phonemes to be spoken by the user, each of the target phonemes being one of the plurality of known phonemes of the language;

c. stores the utterance spoken by the user;

d. segments the stored utterance spoken by the user into a sequence of one or more spoken phonemes, each of the spoken phonemes corresponding to one of the target phonemes;

e. for each of the one or more spoken phonemes:
  i. determines, for each of the plurality of known phonemes in the language, a value that represents the likelihood that the spoken phoneme is one of the plurality of known phonemes in the language;
  ii. responsive to each of the determined values for the spoken phoneme for each of the plurality of known phonemes in the language, computes a posterior probability that the spoken phoneme is one of the plurality of known phonemes;
  iii. responsive to the computed posterior probabilities for the spoken phoneme for each of the plurality of known phonemes in the language, computes a relative posterior probability that the spoken phoneme is the corresponding target phoneme;
  iv. compares the computed relative posterior probability to a first predetermined threshold for the target phoneme;
  v. when the computed relative posterior probability is greater than or equal to the first predetermined threshold, outputs an indication that the pronunciation of the target phoneme was correct; and
  vi. when the computed relative posterior probability is less than the first predetermined threshold, outputs an indication that the pronunciation of the target phoneme was incorrect.

21. The computer implemented system of claim 20, wherein the system:
  vii. compares the computed relative posterior probability to a second predetermined threshold for the target phoneme, wherein the second predetermined threshold is lower than the first predetermined threshold;
  viii. when the computed relative posterior probability is less than the first predetermined threshold and greater than or equal to the second predetermined threshold, outputs an indication that the pronunciation of the target phoneme was acceptable; and
  ix. when the computed relative posterior probability is less than the second predetermined threshold, outputs an indication that the pronunciation of the target phoneme was incorrect.

22. A computer program product for evaluating the pronunciation of an utterance, comprising a non-transitory computer readable medium having computer usable program code embodied therewith, the computer usable program code is configured to:
  a. store in a computer memory a plurality of known phonemes of a language;
  b. receive, via a computer processor, an utterance spoken by a user, the utterance spoken by the user corresponding to a target utterance, the target utterance being comprised of a sequence of one or more target phonemes to be spoken by the user, each of the target phonemes being one of the plurality of known phonemes of the language;
  c. store, in a computer memory, the utterance spoken by the user;
  d. segment, via a computer processor, the stored utterance spoken by the user into a sequence of one or more spoken phonemes, each of the spoken phonemes corresponding to one of the target phonemes;
  e. for each of the one or more spoken phonemes:
    i. determine, via a computer processor, for each of the plurality of known phonemes in the language, a value that represents the likelihood that the spoken phoneme is one of the plurality of known phonemes in the language;
    ii. responsive to each of the determined values for the spoken phoneme for each of the plurality of known phonemes in the language, compute, via a computer processor, a posterior probability that the spoken phoneme is one of the plurality of known phonemes;
    iii. responsive to the computed posterior probabilities for the spoken phoneme for each of the plurality of known phonemes in the language, compute, via a computer processor, a relative posterior probability that the spoken phoneme is the corresponding target phoneme;
    iv. compare, via a computer processor, the computed relative posterior probability to a first predetermined threshold for the target phoneme;
    v. when the computed relative posterior probability is greater than or equal to the first predetermined threshold, output, via an output device, an indication that the pronunciation of the target phoneme was correct; and
    vi. when the computed relative posterior probability is less than the first predetermined threshold, output, via an output device, an indication that the pronunciation of the target phoneme was incorrect.

23. The computer program product of claim 22, wherein the computer usable program code is configured to:
  vii. compare the computed relative posterior probability to a second predetermined threshold for the target phoneme, wherein the second predetermined threshold is lower than the first predetermined threshold;
  viii. when the computed relative posterior probability is less than the first predetermined threshold and greater than or equal to the second predetermined threshold, output an indication that the pronunciation of the target phoneme was acceptable; and
  ix. when the computed relative posterior probability is less than the second predetermined threshold, output an indication that the pronunciation of the target phoneme was incorrect.

* * * * *